United States Patent [19]

Ching et al.

[11] Patent Number: 4,681,436
[45] Date of Patent: Jul. 21, 1987

[54] FEMTOSECOND LASER PULSE MEASURING SYSTEM

[76] Inventors: Neng H. Ching, 5 Yasmar Avenue Haberfield 2045; Ralph G. Marson, 37 Mittabah Road Hornsby 2077, both of Sydney NSW; Michael J. Norman, Ursula College ANU, Canberra City 2601 ACT; John L. Hughes, 38 Basedow Street, Torrens, Canberra ACT 2607, all of Australia

[21] Appl. No.: 706,590

[22] Filed: Feb. 28, 1985

[30] Foreign Application Priority Data

Feb. 28, 1984 [AU] Australia ................. PG3822

[51] Int. Cl.$^4$ .................. G01J 1/04; G01J 1/42
[52] U.S. Cl. ...................... 356/121; 356/213; 356/222
[58] Field of Search ............... 356/213, 218, 220–222, 356/224–226, 121; 313/523–524, 538; 250/281, 397

[56] References Cited

U.S. PATENT DOCUMENTS

| | | | |
|---|---|---|---|
| 4,256,962 | 3/1981 | Horton et al. | 250/281 |
| 4,327,285 | 4/1982 | Bradley | 356/213 X |
| 4,434,399 | 2/1984 | Mourou et al. | 250/397 X |
| 4,447,151 | 5/1984 | McLellan et al. | 356/218 |
| 4,548,496 | 10/1985 | Roberts et al. | 356/213 |

FOREIGN PATENT DOCUMENTS 0905657 2/1982 U.S.S.R. ................ 356/213

OTHER PUBLICATIONS

Honda et al, "Measurements of Picosecond Laser Pulses from Mode-Locked Nd: Yag Laser", 1976 Conference on Precision Electromagnetic Measurements, Boulder, Colo., U.S.A. (Jun. 28–Jul. 1, 1976) pp. 33–34.

Primary Examiner—Vincent P. McGraw
Attorney, Agent, or Firm—Cushman, Darby & Cushman

[57] ABSTRACT

A system for measuring laser pulse durations in the range of ten nanoseconds to one femtosecond to an accuracy of one femtosecond, includes a primary pulse sampler, a ten component beam splitter array, optical delay lines whose settings are microprocessor controlled, a ten section interaction chamber with ten sets of ion detectors and a pulse envelope and pulse energy display monitors. The system has applications in chemistry, calibration of fast timing circuits and in the development of short pulse lasers.

15 Claims, 2 Drawing Figures

FEMTOSECOND LASER PULSE MEASURING SYSTEM

BACKGROUND OF THE INVENTION

This invention relates to a system for measuring laser pulse duration with a resolution of 1 femtosecond ($10^{-15}$ seconds) in the range of ten nano seconds down to one femtosecond, comprising primary laser beam sampling optics, a beam splitter array to produce ten equal components of the sampled primary beam, a beam splitter to divide each of the said ten output beams of the beam splitter array into equal beams, laser pulse optical delay line up to one meter in length, laser pulse combining optics, laser beam focussing optics, an array of laser pulse ionization chambers with charged particle detectors mounted inside them, computer control module, a monitor to display the pulse duration and associated optical and electronic equipment.

Prior art femtosecond pulse measuring equipment are an advance on state of the art picosecond laser pulse measuring devices such as streak cameras, involving the detection of signals from ionised gases due to a mode-locked pulse train output which allowed, via convolution, autocorrelation techniques, the profile of the overlapped pulses to be calculated. Said prior art techniques suffered also from the fact that the laser beam path back to the laser beam source was unprotected.

SUMMARY OF THE PRESENT INVENTION

The present invention allows for the sampling of a single laser output pulse to provide both the profile of the pulse envelope and the pulse duration. Furthermore, no problem exists re the open return paths to said laser pulse source of prior art systems. In addition the invention provides a measure of total primary pulse energy and, hence, is able to provide a measure of the peak pulse power in the primary beam down to the femtosecond level. To determine the envelope of said primary laser pulse, it is first of all split into ten equal portions, then each of the said pulse portions is split in half and recombined after optical delay of one halved portion with respect to the other and focussed to ionize the sample gas in one of ten interconnected chambers, the two pulse separation delay being adjusted for each chamber to provide a ten point amplitude measurement from the single primary pulse so that the envelope of the primary pulse can be plotted utilizing state of the art mathematical techniques and a computer, the resultant pulse envelope being displayed on the output monitor or digital displays.

Although the time resolution of the particle detectors are relatively slow, this is not of relevance in the present invention which is based on the extremely rapid rate of change of ion generation in the interaction chamber with increase in laser beam intensity. The basis of our approach to such sensitive detection is multi-photon absorption in atoms of the gas within the interaction chamber. In multiphoton ionization, the number of charge carriers N produced is related to the input laser beam intensities I by the relationship:

$$N \propto I_o^n$$

where $n \geq 5$ for sample gases. It follows that the signal to noise ratio of our detector is extremely large and as the optical delay in the arms are adjusted relative to each other with sub-micron (less than one twentieth of a micron or less than $5 \times 10^{-6}$ cms) accuracy, very high resolutions can be achieved in each ionization chamber, the results of which when computer analyzed, provide a detailed profile of the pulse envelope, and hence the pulse duration at various points such as the half power or one over "e" points. In this invention, the limit of time resolution is determined by the smallest increment by which the optical path in the optical delay lines can be varied.

OUTLINE OF THE DRAWINGS

FIG. 1 shows a section of the invention highlighting the pulse splitting, delay lines, pulse recombination and monitoring optics, focussing optics, interaction chamber, particle detector and a microprocessor.

FIG. 2 shows the overall invention with the primary laser beam optics used to divert a small portion of the primary pulse, a ten segment beam splitter to generate ten equal portions of the primary beam directed, via a laser mirror, into the section of FIG. 1 above, the particle detector output of each of the ten ionizaton chambers being processed via a computer so that the envelope of the primary pulse can be displayed on the output display monitor.

DETAILED DESCRIPTION OF THE DRAWINGS

Figure 1:
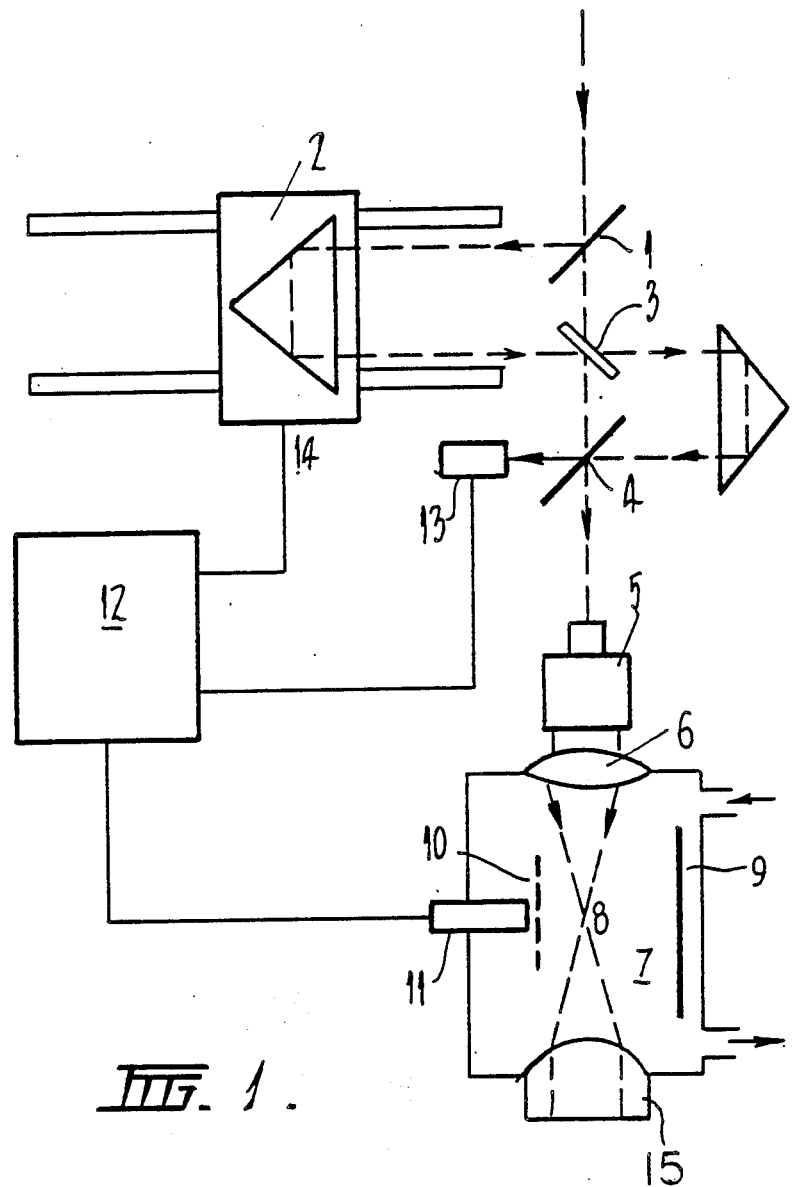

A better understanding of the invention may be obtained from consideration of the following drawings which are not meant to limit the scope of the invention in any way. In FIG. 1 numeral 1 indicates a 50:50 beam splitter which diverts one portion of said input beam into the optical delay line indicated by numeral 2 from whence it is returned to a double sided laser mirror indicated by numeral 3 and refelected off the lower surface onto beam splitter 4, the reflection off the top side of double mirror 3 being diverted into a balancing optical delay line to compensate for the delay introduced by delay line 2.

The 50:50 beam splitter 4 allows the split laser pulse components to be directed along the same path into beam expanding telescope indicated by numeral 5 then through a focussing lens indicated by numeral 6 after which they are focussed into the evacuated chamber indicated by numeral 7 so that the laser beam flux density in the focus region indicated by numeral 8 ionizes the low pressure gas (for example, one milli-torr of nitrogen) in chamber 7 so that they are accelerated along the potential voltage gradient between two electrodes indicated by numerals 9 and 10 respectively, passing through electrode 10 into particle detector 11 whose electrical output is fed into a microprocessor indicated by numeral 12. Microprocessor 12 also accepts a signal from an optical detector indicated by numeral 13 and in turn controls the setting of delay line 2 via lead indicated by numeral 14. The laser pulse exits chamber 7 via the output window indicated by numeral 15 and its energy content can be measured via an energy meter (not shown in FIG. 1)

Figure 2:
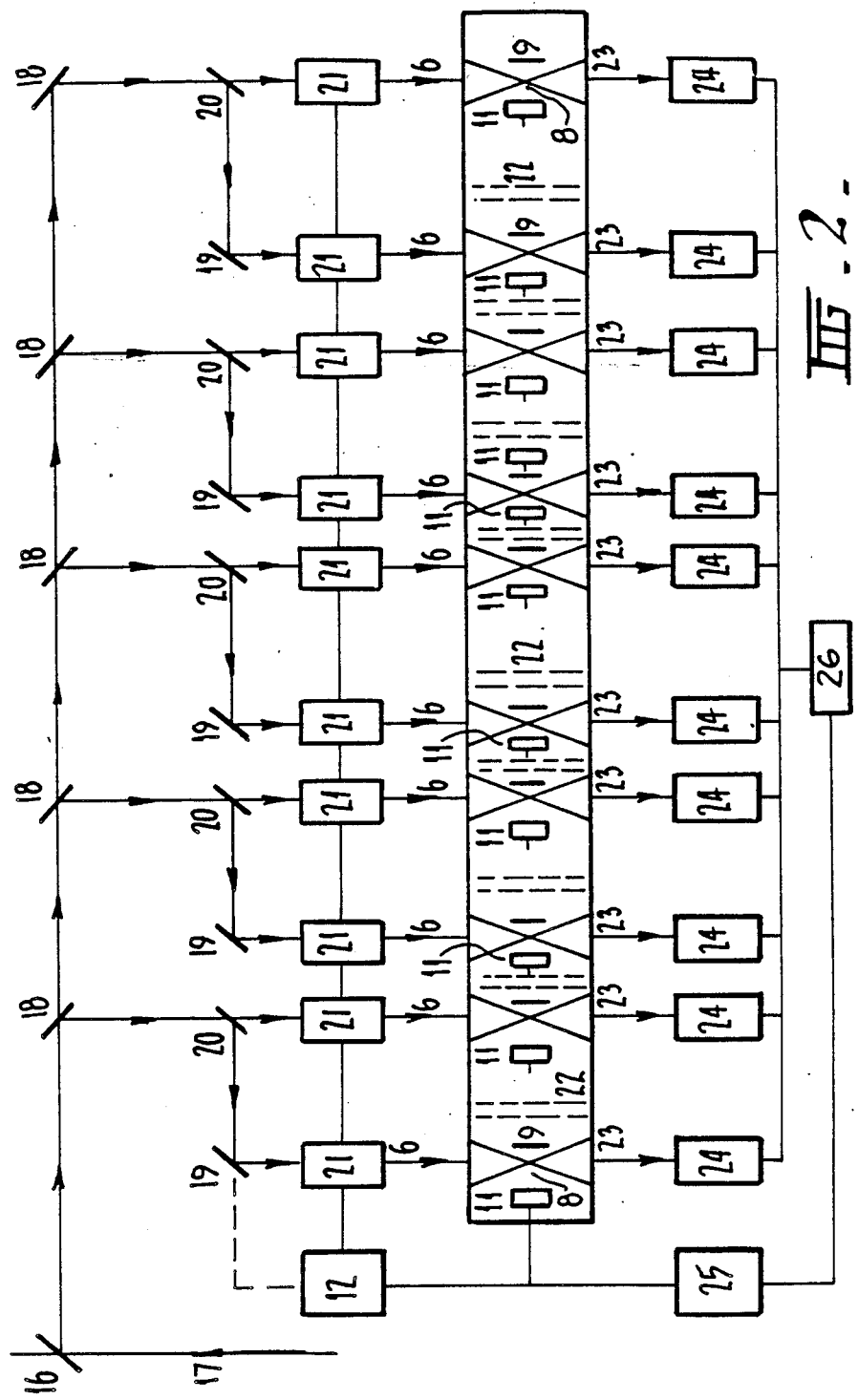

In FIG. 2 numeral 16 indicates the partial reflector used to sample a portion of the laser pulse travelling along the path indicated by numeral 17, said selected portion being split further into five equal parts via the beam splitters indicated by numerals 18. Further beam splitters indicated by numerals 19 and 20 generate a total of ten equal segments of the portion of the original pulse sampled. Each of these selected laser pulses then enter the delay lines as shown in FIG. 1 and indicated in FIG. 2 by numeral 21. The expanded beam output is then passed through lens 6 into interaction chamber 7 which now accommodates the ten pulses, it being partitioned via electrodes indicated by numeral 22. The laser exits through lens windows indicated by numerals 23 into energy meters indicated by numerals 24, and displayed on the monitor indicated by numeral 26.

The delay line settings made via microprocessor 12, result in ten points being evaluated on the envelope of the original laser pulse and displayed a monitor indicated by numeral 25 after appropriate analysis in 7. From the measured pulse duration and the total energy in the pulses, it is possible to estimate the peak power of the pulse.

The invention allows for the measurement of ten points on the envelope of a laser pulse whose duration can extend from nanoseconds ($10^{-9}$ seconds) to one femtosecond ($10^{-15}$ seconds), that is a range of six orders of magnitude. If the laser pulse sampled is not powerful enough to activate the system then it is necessary to add an amplifier stage to bring the sampled pulse up to the required level. The sensitivity of the invention depends on the effectiveness of the gas used in the interaction chamber, nitrogen being a particularly useful gas in this respect.

We claim:

1. Apparatus for measuring the profile of a single laser pulse to an accuracy of a femtosecond, in the pulse duration range of one nanosecond to one femtosecond, comprising:

means for diverting a portion of said single pulse;
   means for splitting the diverted portion into N split portions, N being an integer greater than one;
   means for splitting each of said N portions into first and second components;
   means for independently delaying each of said first and second components of each of said N portions, and for adjusting the delayed first and second components of each of said N portions so that the delayed first and second components of said N portions are overlapped to varying degrees;
   means for expanding the delayed first and second components of each of said N portions;
   means for focusing the expanded first and second components of each of said N portions;
   interaction chamber means containing a low pressure gas, for ionizing said gas with the focused first and second components of each of said N portions, said interaction chamber means having exit window means through which the first and second components of each of said N portions exit;
   ion detector means, coupled to said interaction chamber means, for detecting the ions produced by the focused first and second components of each of said N portions and outputting electrical signals corresponding respectively thereto;
   processing means for receiving the electrical signals from said ion detector means;
   energy detector means for receiving the first and second components of each of said N portions exiting said exit window means of said interaction chamber means, and for providing output signals corresponding to a pulse duration and a total energy of each of said N portions; and
   monitor means for receiving said output signals and providing a display of the envelope and duration of said single laser pulse.

2. Apparatus according to claim 1 wherein said delaying means includes N adjustable delay devices for respectively delaying the first components of said N portions, and N stationary delay devices for respectively delaying the second components of said N portions.

3. Apparatus according to claim 2 wherein said processing means is coupled to said N adjustable delay devices for selectively adjusting the delay of said first components to produce varing degrees of overlap between the first and second components of each of said N portions.

4. Apparatus according to claim 1 wherein said interaction chamber means includes means for providing potential voltage gradients inside said interaction chamber means to accelerate the first and second components of each of said N portions.

5. Apparatus according to claim 1 wherein said means for diverting includes a beam splitter.

6. Apparatus according to claim 1 wherein said means for splitting the diverted portion includes a plurality of beam splitters.

7. Apparatus according to claim 1 wherein N is equal to 10.

8. Apparatus according to claim 1 wherein said means for splitting said N portions includes a plurality of beam splitters and a plurality of mirrors.

9. Apparatus according to claim 1 wherein means for independently delaying includes N delay devices.

10. Apparatus according to claim 1 wherein said means for expanding includes N beam expanders, and wherein said means for focusing includes N objective lenses, and wherein said ion detector means includes N ion detectors, and wherein said interaction chamber means includes N exit windows.

11. Apparatus according to claim 1 wherein said energy detector means includes N energy detectors.

12. Apparatus according to claim 1 further including optical detector means, optically coupled to said means for delaying, for detecting the optical condition of said means for delaying, and for providing output signals to said processing means.

13. Apparatus according to claim 12 wherein said optical detector means includes N optical detectors.

14. Apparatus according to claim 1 wherein said gas includes nitrogen.

15. Apparatus according to claim 1 wherein said monitor means includes first and second monitors.

* * * * *